April 6, 1926.  F. H. ATHERTON  1,579,623
ANTISPLASH DEVICE FOR MOTOR VEHICLES
Filed Sept. 11, 1924
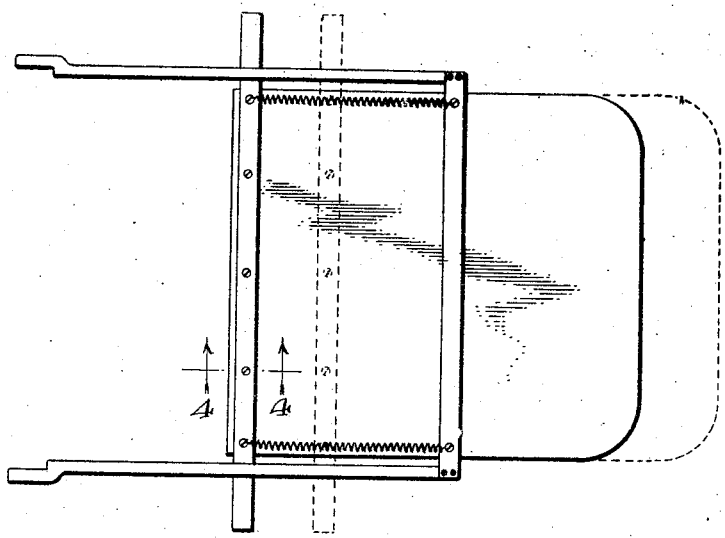
Fig. 1.
Fig. 4.
Fig. 2.
Fig. 5.
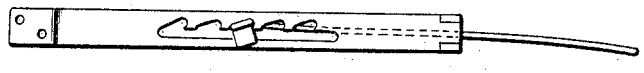
Fig. 3.
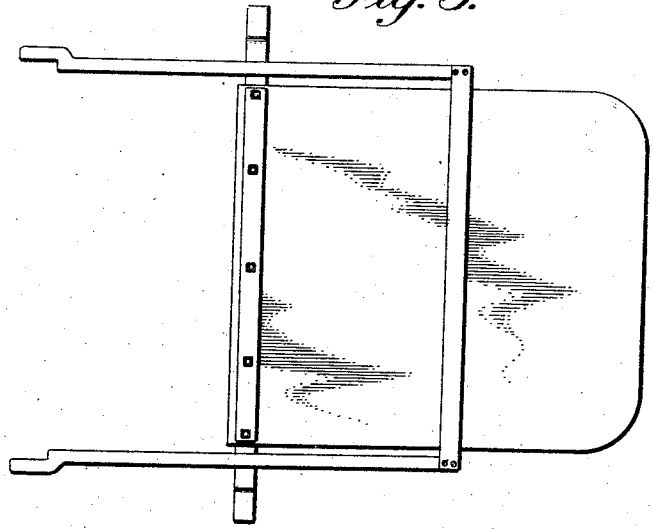
Fig. 6.
Inventor
F. H. Atherton Patented Apr. 6, 1926.

1,579,623

UNITED STATES PATENT OFFICE.

FREDERICK HERBERT ATHERTON, OF PADEN CITY, WEST VIRGINIA.

ANTISPLASH DEVICE FOR MOTOR VEHICLES.

Application filed September 11, 1924. Serial No. 737,167.

*To all whom it may concern:*

Be it known that I, FREDERICK HERBERT ATHERTON, a citizen of the United States, residing at Paden City, in the county of Wetzel and State of West Virginia, have invented certain new and useful Improvements in Antisplash Devices for Motor Vehicles, of which the following is a specification.

This invention pertains to anti-splash devices for motor vehicles and the primary object thereof is to provide a device of this kind which is self-adjusting in encountering stones or other obstructions, or in the instance of the guard striking the ground due to sinking of the vehicle wheel in mud or the like.

The invention further aims to provide a device of this type which is of simple and economical construction, light in weight and which may be easily and quickly installed.

In the drawings:—

Fig. 1 is an elevation of one side of the device;

Fig. 2 is an end edge view;

Fig. 3 is an elevation of the opposite side of the device;

Fig. 4 is a section on line 4—4 of Fig. 1;

Fig. 5 is a detail side elevation of one end of the ratchet bar,

Fig. 6 is a detail perspective view of one of the attaching brackets, and

Figure 7 is a side elevation of the invention applied to a vehicle.

In proceeding in accordance with the present invention, a pair of brackets are employed having bases 1 secured to the chassis and having arms 2 which are horizontally disposed and the outer ends of which extend outwardly beyond the outer side of the wheel.

A pair of bars 3 have offset inner ends 4 that are attached to the arms 2 so as to dispose the bars 3 vertically and hold same against lateral movements. The bars 3 are slotted at 5 and formed with ratchet teeth 6 which latter face upwardly.

The guard 7 proper is preferably formed of a sheet of rubber and is held clamped at its upper end by and between a pair of strips 9. Guide strips 8 are secured to the opposite side faces of the bars 3 and receive the lower end of the sheet 7 therebetween, while coil springs 10 are secured at their ends to the strips 9 and 9 and exert downward tension on the strips 8. The outer ends of one of the strips 9 are formed with stops 11 which engage the respective outer sides of the bars 3 and restrict lateral movement of the guard.

As depicted in Fig. 2 of the drawings, the springs hold one of the strips 9 engaged with the ratchet teeth. Should the guard encounter stones or other obstructions, or should the wheel sink into mud, it will be seen that the ratchet teeth will permit the guard to move upwardly and due to the action of the springs will be engaged with the succeeding upper ratchet teeth and held in its raised position.

The ratchet teeth moreover permit the guard to be both easily and quickly manually adjusted as desired.

What is claimed is:—

1. In an anti-splash guard, brackets formed for attachment to a vehicle chassis, bars formed for vertical attachment to the brackets and having slots with upwardly facing ratchet teeth extending into the slots, guide strips secured to the outer ends of the bars, a guard member, strips secured to opposite sides of the guard member, the ends of one of the last named strips extending through the bar slots and formed to engage the ratchet teeth, stops on said named strip to engage the bars and restrict lateral movement of the guard member, and coil springs secured at their ends to the guide strips and to the strips of the guard member for exerting downward tension on the guard member.

2. In an anti-splash guard, slotted bars formed for vertical disposition, means to secure the bars to a vehicle, upwardly-facing ratchet teeth carried by the bars, a guard member and a strip secured to the guard member and extending through the bar slots and engageable with the ratchet teeth, springs secured to the strip and means to connect the springs to the bars.

3. In an anti-splash guard, supporting means, upwardly-facing ratchet teeth carried thereby, a vertical guard member, means carried by the guard member to engage the ratchet teeth whereby to enable the guard member to move upwardly upon encountering an obstruction and yielding means to hold the means of the guard member engaged with the ratchet teeth but permitting said upward movement of the guard member.

4. In an anti-splash guard, supporting means, a vertical guard member, means to mount the guard member to enable same to move upwardly upon encountering an obstruction, and means to hold the guard member against downward movement upon said upward movement thereof.

5. In an anti-splash guard, supporting means, a vertical guard member, means to mount the guard member to enable same to be adjusted vertically, upwardly facing ratchet teeth carried by the supporting means, means carried by the guard member to engage the ratchet teeth and thereby support the guard member, and means to hold the said means of the guard member in selective engagement with the ratchet teeth.

6. In an anti-splash guard, brackets formed for attachment to a vehicle chassis, bars formed for vertical attachment to the brackets and having slots with upwardly facing ratchet teeth extending into the slots, guide strips secured to the outer ends of the bars, a guard member, strips secured to opposite sides of the guard member, the ends of one of the last named strips extending through the bar slots and formed to engage the ratchet teeth, and means to tension the guard member.

7. In an anti-splash guard, brackets formed for attachment to a vehicle chassis, bars formed for vertical attachment to the brackets and having slots with upwardly facing ratchet teeth extending into the slots, guide strips secured to the outer ends of the bars, a guard member, strips secured to opposite sides of the guard member, the ends of one of the last named strips extending through the bar slots and formed to engage the ratchet teeth, means to tension the guard member, and stops on said named strip to engage the bars and restrict lateral movement of the guard member.

FREDERICK HERBERT ATHERTON.